United States Patent [19]
Rodrigues

[11] Patent Number: 6,144,717
[45] Date of Patent: Nov. 7, 2000

[54] WHEEL MOUNTED DATA LOGGER

[76] Inventor: Amadeu Tonussi Rodrigues, R. Professora Maria Coutinho, 557/ 201, 30530-600 - Belo Ho-Rizonte - MG, Brazil

[21] Appl. No.: 08/860,915
[22] PCT Filed: Jan. 12, 1996
[86] PCT No.: PCT/BR96/00014
  § 371 Date: Jul. 14, 1997
  § 102(e) Date: Jul. 14, 1997
[87] PCT Pub. No.: WO96/22508
  PCT Pub. Date: Jul. 25, 1996

[30] Foreign Application Priority Data

Jan. 13, 1995 [BR] Brazil ................ 9500251

[51] Int. Cl.$^7$ ...................... G01C 21/00
[52] U.S. Cl. ................ 377/24.1; 377/16
[58] Field of Search ............... 377/24.1, 16

Primary Examiner—Margaret R. Wambach
Attorney, Agent, or Firm—Ladas & Parry

[57] ABSTRACT

A wheel mounted data logger has an odometer for mounting at a hub of a wheel of a vehicle and response to turning of the wheel, an hourmeter for mounting on a structure of the vehicle and response to running of an engine of the vehicle, and microcontroller for mounting on the vehicle and receiving, recording and transmitting the responses of the odometer and hourmeter. The odometer, hourmeter and microcontroller are mounted on the vehicle as a unit preferably by adhesive.

20 Claims, 1 Drawing Sheet

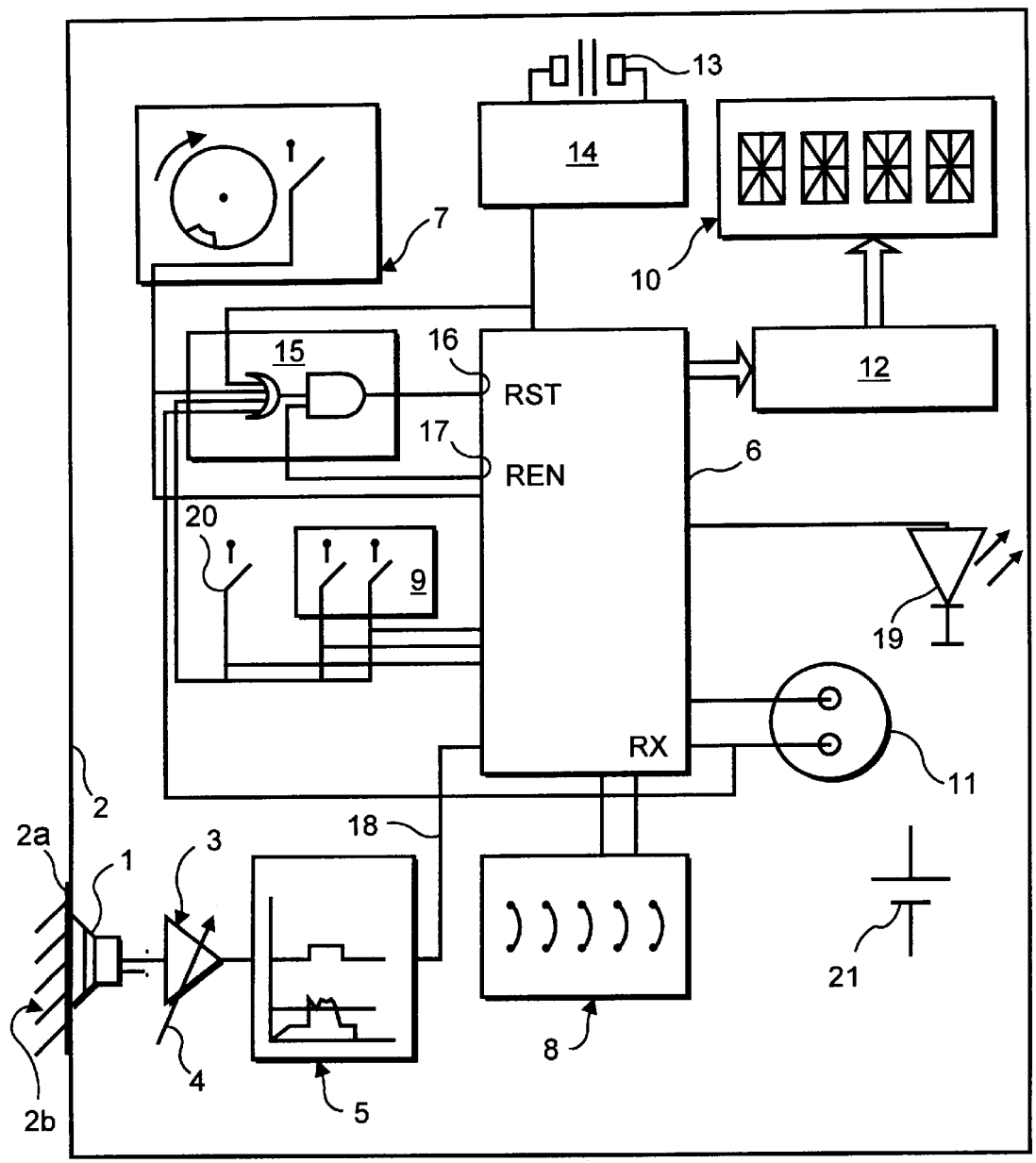

WHEEL MOUNTED DATA LOGGER

BACKGROUND OF THE INVENTION

I. Field of the Invention

The present invention relates to an hubodometer and hourmeter unit for vehicle monitoring. More specifically the present invention refers to such a unit that detects by acoustic waves whether the engine of the vehicle is running.

II. Description of the Related Art

Wheel mounted distance counters (hubodometers) are well known to the transportation community to totalize the distances traveled by vehicles as a function of the number of turns performed by the wheels of the vehicles.

The usefulness of such devices arises from their secure data acquisition means that is not prone to most of the actions that may cause a standard panel odometer to stop working. Such actions, sometimes intentional, may be power failures, flexible shaft breaking, inadequate repair procedures on any of its many system components, and so on, that are not always evident. Another advantage of the wheel mounted hubodometers is allowing data collection without entering the vehicle cabins. However, the dust, water, heat and vibration at the wheel hubs require well designed, strong yet lightweight devices.

Also widely used in the transportation community are time counters (hourmeters), which accumulate the hours and fractions of hours the engines of vehicles have been run. Two basic types of such devices exist. The first type comprises hourmeters that are driven by engine crankshafts to exhibit the working times of the engines as functions of the crankshaft rotations, such hour-indications being accurate only for specified engine speeds. Despite the time inaccuracies of such readings, which make them inadequate for labor logging and accounting, they are quite useful for determining engine maintenance and overhaul intervals, due to the dependence of the readings on the crankshaft turns. The second type of hourmeters comprises devices driven by time machinery, or so-called the true-time hourmeters. Usually these are electro-mechanic or electronic devices powered only during the periods the engines are running. However, both types of hourmeters require physical connections to the engines. Whether the connections are mechanical or electric, they can be suspended, leading to false undercountings.

SUMMARY OF THE INVENTION

An object of the invention is to provide a unit to simultaneously log engine running or not-running conditions, traveled distances and developed speeds mounted externally to the wheel hub of a vehicle or machine by simple anchoring, without requiring wiring or mechanical gearing, being self-powered by internal batteries, and allowing data exchange to a portable computer. Such an apparatus, being reliable, lightweight, cheap and easy to install and use, would find broad acceptance as a supervisory, management and accounting tool in fleets of vehicles, particularly if non-homogeneous, for agricultural, industrial and construction use. Its most important advantages over more sophisticated panel apparatus are its inherent simplicity that makes it suitable and attractive to be used in hostile environments and on simple machinery, and the standardized utility on different equipment.

To these ends, the present invention provides a unit that is both a wheel-mounted odometer (hubodometer) and a true-time hourmeter featuring an acoustic sensor to indicate whether the engine is running or not running.

The unit may have a display to exhibit the odometer and hourmeter data, or it may have a single light emitting device (LED) in applications where low production cost is a must, or no display at all, because the main way to export data from its memory is through an interface to an external data collector.

Although any attaching means such as bolts and nuts may be used to anchor such a unit to the wheel hub, the easiest and, therefore, preferred means envisaged is adhesive bonding. To make this feasible, lightweightness is a prime matter of concern. Another advantage of this simple anchoring method is in making it easy to elect the device as a standard by allowing fast installation on various vehicles of a fleet without having to provide mechanical mounting components specific to each of the vehicles. This reduces overall set up time, which is quite an important advantage in adapting the new data logging system to an existing heterogeneous fleet of vehicles, as usually required.

All the functions are determined by the internal microcontroller. No specific type of microcontroller has to be used to allow, additionally, logging of start and finish times of vehicle displacement or operation and the time and rate of excessive displacement speeds. It is just a matter of memory size and clock/calendar implementation.

For a microcontroller having a small memory, a special memory mapping scheme can be devised to allow bits related to determined periods of the day to be set or reset according to engine running or not-running conditions, respectively, in the corresponding periods. The same procedure can be applied to other bits related to vehicle displacement. If the memory size is not so small for the desired number of intervals, the value of the distance traveled during that interval is stored instead of a simple bit. Going further, a code that best describes the developed speed range in that interval also can be stored. A top speed can be stored instead.

BRIEF DESCRIPTION OF THE DRAWING

The novel features believed characteristic of the invention are set forth in the appended claims. The invention itself, however, as well as a preferred mode of use, further objects and advantages thereof will best be understood by reference to the following detailed description of an illustrative embodiment when read in conjunction with the accompanying drawing, wherein:

the FIGURE is a schematic block diagram of such a hourmeter/hubodometer that includes the acoustic engine-sensor function.

DETAILED DESCRIPTION OF THE PREFERRED MODE OF THE INVENTION

In the hubodometer/hourmeter unit shown in the FIGURE, an acoustic transducer 1 is in a case 2 mounted by adhesive 2a on a supporting structure 2b of a vehicle. The acoustic transducer, which is piezoelectric due to its low cost and intrinsic high output voltage, is excited by vibrations, e.g. engine vibrations, coming from the supporting structure 2b of the vehicle, e.g. its wheel hub. Due to its inherent simplicity, the preferred way of installing the apparatus to the wheel hub is adhesive.

The output of the acoustic transducer 1 feeds a signal amplifier 3 equipped with a gain control 4. The output of the amplifier is filtered, detected and finally compared with a threshold level in comparator 5. The threshold level is chosen about halfway between an upper limit of an environmental vibration (i.e., noise) level when the engine is stopped and a lower limit of the engine noise level. The output of the comparator 5 is fed to one of the logical inputs 18 of a microcontroller 6 for the engine-running time.

A wheel-turn sensor 7 may be a damped inertial pendular device or shaft-rotation detector. Its output is provided to an input pin of the microcontroller 6.

The engine-running time and the traveled distance are accumulated in the microcontroller 6. The traveled distance is computed by applying to the turns of the wheel sensed by the wheel-turn sensor a constant parameter that expresses the ratio between the number of wheel turns and the corresponding vehicle displacement. This constant depends on the wheel circumference and, thus, differs from vehicle to vehicle. To set this constant, one among several possible methods is implemented. In this case, there is a jumper matrix 8 on another logical input of the microcontroller 6; another method is writing into the microcontroller 6 at an initial setup phase through setup switches 9 while observing the set up on a display 10, or from an external computer (not shown) connected through a data link 11.

This display-equipped version of the apparatus uses a liquid crystal-type display (LCD-type display) 10 for displaying the engin-running time and traveled distance from the microcontroller 6 to achieve low power consumption. A display driver 12 remains on even while the microcontroller is stopped to keep the display 10 on all the time.

A crystal oscillator 13 assures the perfect timing required by the serial communication port 11 and allows an optional clock/calendar to be implemented. Setting up this clock calendar is performed in the usual way whenever the apparatus connects to the computer through the communication port 11.

Inside the microcontroller 6, data may be recorded in several different ways. The most important data are the total work (engine-running) time, total vehicle movement time, total traveled distance and excessive speed total time. As current microcontrollers, even the low cost ones, offer memory enough to implement many registers and, usually, a serial data port, the microcontroller, to be considered up-to-date, shall have internal hardware and software (firmware) to provide data keeping and exportation in such more detailed forms. Speed calculation is useful and trivial, for example, from wheel-turn sensor 7 signal frequency.

To achieve long-term operation out of small size batteries 21 and a standard microcontroller 6, the microcontroller should stop whenever a main program-loop end is reached. This minimizes power consumption and only requires an external timer 14 connected to the oscillator 13 to regularly start up the loop, for instance each tenth of a second. Device 15 is a representation of one of many possible arrangements to allow any of the peripheral devices (i.e., wheel-turn sensor 7, switches 9, timer 14, switch 20 or communication port 11) to wake up the microcontroller 6 through a reset pin 16. In the arrangement shown, a signal from the timer 14, the serial port 11 at pin RX of the microcontroller 6, the switch 20, which is responsive to an access door (not shown), the setup switches 9 and the wheel-turn sensor 7 will wake up the microcontroller whenever any of them occur.

Before stopping, the microcontroller 6 enables such reset by means of one of its logical outputs 17.

However, the signal to logical input 18 of the microcontroller from the engine-noise sensor 1 shall not wake up the microcontroller. Instead it is polled over the main loop execution started by the external timer 14. The external timer 14 output cadence being low, say one per second, and the time required for the microcontroller to perform the instructions being short, imply microcontroller stop time much longer than the active time, resulting low average power consumption, as desired.

In the transportation community, it is important the operator or manager be given a tool to check that the apparatus is running properly. For this, this display-equipped hubodometer/hourmeter exhibits its status at the LCD display 10.

However, an alternative means of signaling instead of the display is also shown and can be used for hubodometers/hourmeters not equipped with the LCD display 10. The alternative means comprises an LED 19 that flashes at regular intervals to inform that the apparatus is powered properly. A different signal from this same LED 19, two light pulses in sequence for instance, replaces the one pulse signal when engine noise is properly detected. To facilitate noise threshold setups, the switch 20 at the setup adjustment access door turns the LED 19 signal from pulsed to continuous when the cover is open and the noise above the threshold level.

Environmental random noise may reach the sensor 1 sufficiently to indicate that the engine is running while it is actually not running. To avoid this erroneously indicated engine-running condition that might lead to false logging, the engine running data is stored in the microcontroller 6 only after the majority of many readings performed within a time period indicate that the engine is running.

Interference with the sensing of the engine noise created by the vehicle traveling does not matter. Usually, the engine is running during traveling, and so will be logged.

Except for the battery 21, contacts of the communication port 11, the LCD 10, LED 19 and the sensitivity gain adjustment 4 all parts of the hubodometer and hourmeter are encapsulated in an isolating resin to become mechanically stable and resistant to moisture. The resin may form the case 2 or be inside it to define the unit of the invention alone or in combination.

What is claimed is:

1. A wheel mounted data logger, comprising:
   an odometer for mounting at a hub of a wheel of a vehicle and responding to turning of the wheel;
   an hourmeter for mounting on a structure of the vehicle and responding to running of an engine of the vehicle;
   a microcontroller for mounting on the vehicle and receiving, recording and transmitting the responses of the odometer and hourmeter; and
   mounting means for the mounting of the odometer, hourmeter and microcontroller on the vehicle as a unit.

2. The wheel mounted data logger according to claim 1, wherein the hourmeter comprises an acoustic sensor.

3. The wheel mounted data logger according to claim 2, wherein the acoustic sensor is an acoustic transducer responsive to engine vibrations.

4. The wheel mounted data logger according to claim 3, wherein the acoustic transducer comprises a piezoelectric element.

5. The wheel mounted data logger according to claim 1, and further comprising a light emitting device for displaying outside the mounting means power-on and engine-running conditions.

6. The wheel mounted data logger according to claim 4, and further comprising a light emitting device for displaying outside the mounting means power-on and engine-running conditions.

7. The wheel mounted data logger according to claim 1, wherein the mounting means comprises a resin encapsulating the odometer and hourmeter.

8. The wheel mounted data logger according to claim 6, wherein the mounting means comprises a resin encapsulating the odometer and hourmeter.

9. The wheel mounted data logger according to claim 1, wherein the mounting means comprises a case about the odometer, hourmeter and microcontroller.

10. The wheel mounted data logger according to claim 8, wherein the mounting means comprises a case about the odometer, hourmeter, microcontroller and resin.

11. The wheel mounted data logger according to claim 1, wherein the mounting means comprises an adhesive on the structure of the vehicle.

12. The wheel mounted data logger according to claim 8, wherein the mounting means comprises an adhesive on the structure of the vehicle.

13. A hourmeter hubodometer device for use in a vehicle for recording in an internal memory operating data resultant from detecting running of an engine of the vehicle and revolutions of a wheel of the vehicle, comprising means for sensing the running of the engine, a wheel revolution sensor, a microcontroller, an LED display a battery and a data communication port, all inside a single housing.

14. The hourmeter hubodometer of claim 13, wherein said means is mechanically connected to a structure of the vehicle to receive mechanical sound and vibration waves generated by the engine of the vehicle.

15. The hourmeter hubodometer of claim 13, wherein said means is an acoustic-electric transducer.

16. The hourmeter hubodometer of claim 15, wherein said means comprises a piezo-electric element.

17. The hourmeter hubodometer of claim 13, comprising at least one engine running total time memory register and one total traveled distance memory register.

18. The hourmeter hubodometer of claim 13, and further wherein the LED display is visible from outside the housing for displaying power on and engine running conditions.

19. The hourmeter hubodometer of claim 13, comprising an algorithm to perform periodic samplings of an engine running condition ft a time periad only when most of the samplings performed in that time period are valid.

20. The hourmeter hubodometer of claim 13, wherein at least one of the means, sensor and microcontroller is in an isolating material.

* * * * *